(No Model.)
G. P. TOBIAS.
SALT LICK.
No. 586,148. Patented July 13, 1897.
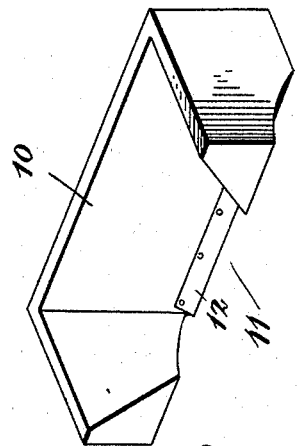
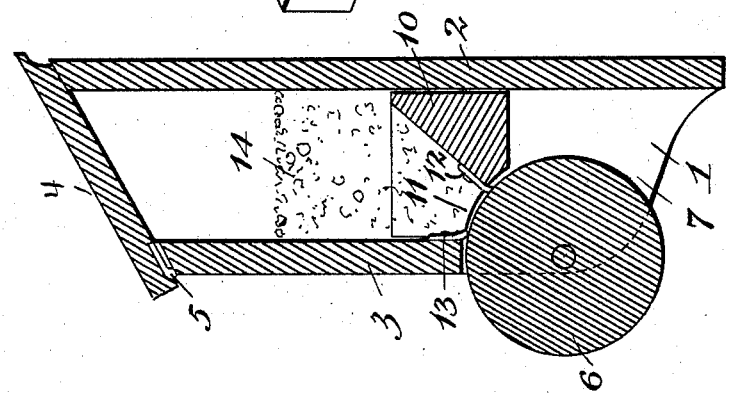
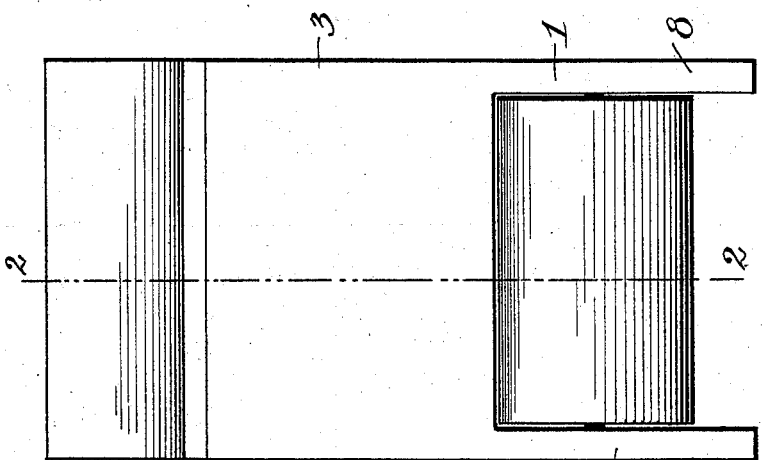
WITNESSES
J. Frank Culverwell
W. W. Poynton
INVENTOR
George P. Tobias.
By John Hedderhessie
Attorney

UNITED STATES PATENT OFFICE.

GEORGE P. TOBIAS, OF PANORA, IOWA.

SALT-LICK.

SPECIFICATION forming part of Letters Patent No. 586,148, dated July 13, 1897.

Application filed January 19, 1897. Serial No. 619,744. (No model.)

*To all whom it may concern:*

Be it known that I, GEORGE P. TOBIAS, a citizen of the United States, residing at Panora, in the county of Guthrie and State of Iowa, have invented certain new and useful Improvements in Salt-Licks; and I do hereby declare the following to be a full, clear, and exact description of the invention, such as will enable others skilled in the art to which it appertains to make and use the same.

My invention relates to improvements in salt-licks, and has for its object the production of a simple, durable, and efficient device designed to supply salt to stock without waste or liability of chafing the tongue of the animal.

Referring to the drawings, Figure 1 is a front elevation of my device. Fig. 2 is a central vertical section on the line 2 2 of Fig. 1. Fig. 3 is a detail view of the gravity-hopper.

Referring to the numerals on the drawings, 1 indicates the frame of my lick, consisting of a base-plate 2, a comparatively short front plate 3, and an inclined cover 4, hinged, as at 5, to the plate 3, designed to protect the salt contained in the lick.

6 indicates what I will call a "lick-roller" pivoted between the side walls 7 and 8 of the casing in line with the front plate 3.

The lick-roller 6 extends slightly beyond the middle of the casing, the front wall 3 of which nearly contacts with its periphery.

10 indicates what I will call a "gravity-hopper" located within the casing at the upper edge of the roller and preferably having converging sides and one lower corner cut away to form a segmental discharge-aperture 11, designed to fit the periphery of the roller 6.

12 and 13 are flexible strips designed to prevent wasting of the salt.

The salt 14 is located within the casing above the hopper, which latter is held yieldingly against the surface of the lick-roller.

In operation as the animal revolves the lick-roller 6 he moistens its periphery with his tongue, causing a sufficient quantity of salt to adhere and to be presented to the tongue of the animal in the shape of a thick brine. The flexible strips 12 and 13 prevent any surplus salt from escaping.

I do not desire to limit myself to the details of construction herein shown and described, but reserve to myself the right to change, modify, or vary them at will within the scope of my invention.

Having thus described the invention, what is claimed as new, and desired to be secured by Letters Patent, is—

1. In a salt-lick, the combination with a casing and lick-roller, of a yielding hopper comprising a plurality of sides arranged to contact at all times with the latter, substantially as specified.

2. In a salt-lick, the combination with a casing having a comparatively short front wall, of a lick-roller pivoted in line with said wall and projecting in advance thereof, and a gravity-hopper above the roller in yielding contact therewith, substantially as specified.

3. In a salt-lick, the combination with a casing and a lick-roller journaled in line with the front wall thereof, of a gravity-hopper comprising side walls and yieldingly contacting with the roller, and a flexible strip extending along one of the longitudinal edges of the hopper adjacent to the discharge-opening thereof, said strip being carried by the hopper, substantially as specified.

In testimony whereof I have signed this specification in the presence of two subscribing witnesses.

GEORGE P. TOBIAS.

Witnesses:
E. F. GREEN,
A. T. WHITMER.